(12) United States Patent
Kinoshita et al.

(10) Patent No.: US 10,710,346 B2
(45) Date of Patent: Jul. 14, 2020

(54) DECORATIVE SHEETS, METHODS FOR PRODUCING THE SAME, AND DECORATIVE MATERIALS

(71) Applicant: TOPPAN PRINTING CO., LTD., Tokyo (JP)

(72) Inventors: Kazuki Kinoshita, Tokyo (JP); Kengo Hozumi, Tokyo (JP); Yuki Saito, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 16/280,982

(22) Filed: Feb. 20, 2019

(65) Prior Publication Data

US 2019/0176446 A1 Jun. 13, 2019

Related U.S. Application Data

(63) Continuation of application No. PCT/JP2017/036537, filed on Oct. 6, 2017.

(30) Foreign Application Priority Data

Oct. 11, 2016 (JP) .................................. 2016-199962

(51) Int. Cl.
*B32B 27/16* (2006.01)
*B32B 27/32* (2006.01)
(Continued)

(52) U.S. Cl.
CPC ................ *B32B 27/16* (2013.01); *B32B 7/12* (2013.01); *B32B 21/02* (2013.01); *B32B 21/08* (2013.01);
(Continued)

(58) Field of Classification Search
CPC ............. B32B 2255/10; B32B 2255/26; Y10T 428/24901; Y10T 428/24851; Y10T 428/24802
(Continued)

(56) References Cited

U.S. PATENT DOCUMENTS 5,827,788 A * 10/1998 Miyakoshi ............ B44C 5/0407
442/164
2001/0046594 A1* 11/2001 Takemoto ................. B44C 1/10
428/203
(Continued)

FOREIGN PATENT DOCUMENTS

JP    H09-290487 A    11/1997
JP    2001-047572 A    2/2001
(Continued)

OTHER PUBLICATIONS

European Search Report dated Aug. 26, 2019 for EP App. No. 17860491.4, 11 pages.
(Continued)

*Primary Examiner* — Betelhem Shewareged
(74) *Attorney, Agent, or Firm* — Foley & Lardner LLP (57) ABSTRACT

A decorative sheet, a method for producing the same, and a decorative material are provided. The method for producing a decorative sheet includes the steps of: forming a pattern layer on one surface of a thermoplastic resin substrate layer; forming a transparent thermoplastic resin layer on the pattern layer; and forming one or more surface protective layers on the transparent thermoplastic resin layer, wherein the step of forming the surface protective layer is a step of forming the surface protective layer by application of a coating liquid containing UV-curable resin and subsequent irradiation with 365 nm wavelength UV light with an integrated light quantity in a range of 100 mJ/cm² or more and less than 400
(Continued)

mJ/cm$^2$, and an overall thickness is in a range of 40 μm or more and less than 500 μm.

20 Claims, 1 Drawing Sheet (51) Int. Cl.
| | |
|---|---|
| B32B 27/36 | (2006.01) |
| B32B 27/40 | (2006.01) |
| B32B 27/26 | (2006.01) |
| B32B 27/08 | (2006.01) |
| B32B 7/12 | (2006.01) |
| B32B 21/08 | (2006.01) |
| E04F 15/16 | (2006.01) |
| B32B 21/02 | (2006.01) |
| B32B 27/20 | (2006.01) |
| B32B 21/14 | (2006.01) |
| E04F 15/10 | (2006.01) |
| B32B 38/00 | (2006.01) |
| B32B 37/12 | (2006.01) |
| E04F 13/08 | (2006.01) |

(52) U.S. Cl.
CPC ............. *B32B 21/14* (2013.01); *B32B 27/08* (2013.01); *B32B 27/20* (2013.01); *B32B 27/26* (2013.01); *B32B 27/32* (2013.01); *B32B 27/36* (2013.01); *B32B 27/40* (2013.01); *E04F 15/102* (2013.01); *E04F 15/16* (2013.01); *B32B 37/12* (2013.01); *B32B 2038/0076* (2013.01); *B32B 2250/02* (2013.01); *B32B 2250/03* (2013.01); *B32B 2250/04* (2013.01); *B32B 2250/242* (2013.01); *B32B 2255/10* (2013.01); *B32B 2255/26* (2013.01); *B32B 2255/28* (2013.01); *B32B 2307/4023* (2013.01); *B32B 2307/4026* (2013.01); *B32B 2307/412* (2013.01); *B32B 2307/554* (2013.01); *B32B 2307/584* (2013.01); *B32B 2310/0831* (2013.01); *B32B 2323/10* (2013.01); *B32B 2375/00* (2013.01); *B32B 2419/00* (2013.01); *B32B 2451/00* (2013.01); *E04F 13/0866* (2013.01); *Y10T 428/24802* (2015.01); *Y10T 428/24851* (2015.01); *Y10T 428/24901* (2015.01)

(58) Field of Classification Search
USPC ...................................... 428/195.1
See application file for complete search history.

(56) References Cited

U.S. PATENT DOCUMENTS

| | | | | |
|---|---|---|---|---|
| 2011/0268933 | A1* | 11/2011 | Hahn ..................... | B32B 5/26 428/195.1 |
| 2013/0333821 | A1* | 12/2013 | Hahn ..................... | B32B 5/26 156/60 |
| 2016/0340916 | A1* | 11/2016 | Wright ................. | E04F 15/107 |
| 2019/0176446 | A1* | 6/2019 | Kinoshita ............. | E04F 15/16 |

FOREIGN PATENT DOCUMENTS

| | | | |
|---|---|---|---|
| JP | 2001-129937 A | 5/2001 | |
| JP | 2008-106591 A | 5/2008 | |
| JP | 2012-035512 A | 2/2012 | |
| JP | 5045180 B2 | 10/2012 | |
| JP | 2014-084684 A | 5/2014 | |
| JP | 2015-010426 A | 1/2015 | |
| WO | WO-2016134243 A2 * | 8/2016 | ............. B32B 27/08 |

OTHER PUBLICATIONS

Database WPI Week 201215, Thomson Scientific, London, GB; AN 2012-C455534 XP002793560 & JP2012035512A, Dainippon Printing Co Ltd, Feb. 23, 2012, 3 pages.

Database WPI Week 200825, Thomson Scientific, London, GB; AN 2008-D28590 XP002793559 & JP2008106591A (CN200710091342A), Dainippon Printing Co Ltd, May 8, 2008, 6 pages.

International Searching Authority, "Intrenational Search Report," issued in connection with International Patent Application No. PCT/JP2017/036537, dated Sep. 19, 2017.

International Searching Authority, "Written Opinion," issued in connection with International Patent Application No. PCT/JP2017/036537, dated Sep. 19, 2017.

\* cited by examiner

DECORATIVE SHEETS, METHODS FOR PRODUCING THE SAME, AND DECORATIVE MATERIALS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/036537, filed on Oct. 6, 2017, which is based upon and claims the benefit of priority to Japanese Patent Application No. 2016-199962, filed on Oct. 11, 2016; the disclosures of which are all incorporated herein by reference in their entireties.

TECHNICAL FIELD

The present invention relates to a method for producing a decorative sheet, a decorative sheet obtained by the production method, and a decorative material with the decorative sheet.

BACKGROUND ART

Decorative sheets have been developed and advanced in the process of growth of the residential building industry. In particular, apartments and condominiums, which are collective residences, and prefabricated houses, which are individual residences, have played the leading role.

Housings have been conventionally built by using materials such as woods and stones indigenous to each region, and in a style rooted to a specific culture. However, as industrialization has spread with development of residential industry, natural materials have been replaced with artificial materials. In addition, frequent use of high grade wood materials and stone materials in recent years, which may lead to a risk of deforestation and environmental problem, also contributes to the expansion of demand for decorative sheets.

In recent years, improvements in scratch resistance of sheet surface have been required in the performance of decorative sheets, and a large number of various improvements have been reported. One of such improvements is to provide a protective layer on a front layer of a decorative sheet. In particular, use of heat-curable resin, UV-curable resin, or electronic beam-curable resin is commonly known (for example, see PTL 1).

Thus, in processing of decorative sheets into decorative materials such as decorative boards, there is often a demand to provide decorative sheets without having quality defects such as wrinkle and flare.

CITATION LIST

[Patent Literature] PTL 1: JP 5045180 B

SUMMARY OF THE INVENTION

Technical Problem

However, in the embodiment using a UV-curable resin according to the technique described in PTL 1, flare or wrinkle of a decorative sheet may occur due to heat generated when the decorative sheet is irradiated with undue UV light. This has room for improvement.

The present invention has been made in view of the above circumstances, and aims to provide a decorative sheet exhibiting good scratch resistance while ensuring qualities such as appearance, as well as good bendability, and a method for producing the same, and a decorative material.

Attempted Solution to the Problem

In order to address the above issue, the present inventors have intensively studied and found that, in production of a surface protective layer made of a UV-curable resin for improving the scratch resistance of a sheet surface, the performance is improved by specifying the amount of radiation of UV light.

The present invention is based on the above findings of the present inventors, and an aspect of the present invention for addressing the above issue is a decorative sheet including: a thermoplastic resin substrate layer; a pattern layer; a transparent thermoplastic resin layer; and a surface protective layer, which are disposed at least in this order, wherein a test result according to European standard EN16094 for an outermost surface of the surface protective layer is 3 or more, and an overall thickness is in a range of 40 μm or more and less than 500 μm.

Further, another aspect of the present invention for addressing the above issue is a decorative material including: a decorative sheet including a thermoplastic resin substrate layer, a pattern layer, a transparent thermoplastic resin layer, and a surface protective layer, which are disposed at least in this order, wherein a test result according to European standard EN16094 for an outermost surface of the surface protective layer is 3 or more, and an overall thickness is in a range of 40 μm or more and less than 500 μm;

an adhesive layer provided on a surface of the thermoplastic resin substrate layer of the decorative sheet on a side opposite to that facing the pattern layer; and a substrate which is adhered to the thermoplastic resin substrate layer via the adhesive layer.

Further, another aspect of the present invention for addressing the above issue is a method for producing a decorative sheet including the steps of:

forming a pattern layer on one surface of a thermoplastic resin substrate layer;

forming a transparent thermoplastic resin layer on the pattern layer; and forming one or more surface protective layers on the transparent thermoplastic resin layer, wherein the step of forming the surface protective layer is a step of forming the surface protective layer by application of a coating liquid containing UV-curable resin and subsequent irradiation with 365 nm wavelength UV light with an integrated light quantity in a range of 100 mJ/cm$^2$ or more and less than 400 mJ/cm$^2$, and an overall thickness is in a range of 40 μm or more and less than 500 μm.

Desired Advantageous Effects of Invention

According to an aspect of the present invention, it is possible to provide a decorative sheet exhibiting good scratch resistance while ensuring qualities such as appearance, as well as good bendability, a method for producing the same, and a decorative material.

DESCRIPTION OF REPRESENTATIVE EMBODIMENTS

In the following detailed description, specific details will be described and in reference to the drawings in order to provide a complete understanding of an embodiment of the present invention. However, it is apparent that one or more representative embodiments can be carried out without such specific details. The present invention is not limited to the following representative embodiments, and appropriate modifications can be made without departing from the spirit of the present invention. The representative embodiments described below are merely examples of the present invention, and the design thereof could be appropriately changed by one skilled in the art. In the drawings referred to in the following description, for clarity, characteristic parts are enlarged, and thus the components are not shown to scale. Further, for the purpose of simplification of the drawings, known structures and apparatuses may be schematically illustrated. In the drawings, the same reference signs are assigned to the same or corresponding parts, and redundant description is omitted. Moreover, the positional relationships, such as up and down, left and right, are based on the positional relationships shown in the drawings, unless otherwise specified. Furthermore, the dimension ratios in the drawings are not limited to the ratios shown therein.

(Decorative Sheet)
<Configuration>

Figure 1:
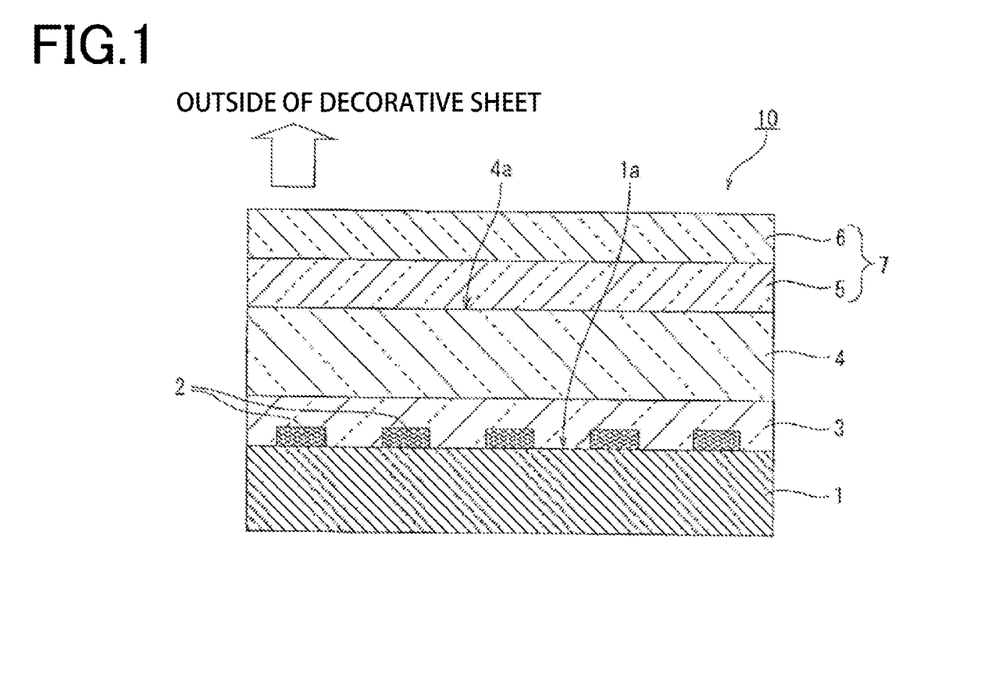
FIG. 1 is a cross-sectional view illustrating a configuration of a decorative sheet according to an embodiment of the present invention.

As shown in FIG. 1, a decorative sheet (hereinafter, also referred to as a sheet) 10 of the present embodiment includes a thermoplastic resin substrate layer 1, a pattern layer 2 provided on a front surface 1a of the thermoplastic resin substrate layer 1, a transparent adhesive layer 3 provided on the pattern layer 2, a transparent thermoplastic resin layer 4 provided on the transparent adhesive layer 3, and a surface protective layer 7 provided on the transparent thermoplastic resin layer 4. An outermost layer, which is located at least on the outermost position of the surface protective layer 7, contains an ionizing radiation-curable resin as a main component.

The ionizing radiation-curable resin as described herein refers to a synthetic resin which chemically changes from liquid to solid in response to application of the energy of ionizing radiation (for example, UV light, $\alpha$-rays, $\beta$-rays, or $\gamma$-rays). An example of the ionizing radiation-curable resin is UV-curable resin. In the present embodiment, the surface protective layer 7 may be a single-layer film or a laminate film composed of a plurality of layers. FIG. 1 illustrates the surface protective layer 7 which is a two-layered laminate film composed of a first surface protective layer 5 and a second surface protective layer 6 in which the second surface protective layer 6 is provided as an outermost layer located on the outermost position of the surface protective layer 7.

Further, the expression "provided on the pattern layer 2" described above regarding the transparent adhesive layer 3 means that the transparent adhesive layer 3 is provided on the pattern layer 2, including a case where another layer is interposed between the pattern layer 2 and the transparent adhesive layer 3. The expression "provided on" as used herein for describing the relationship between other layers also has the same meaning.

Moreover, the decorative sheet 10 further includes a thermoplastic resin rear surface layer 8 provided on a rear surface 1b of the thermoplastic resin substrate layer 1. In the decorative sheet 10 shown in FIG. 1, the thermoplastic resin rear surface layer 8, the thermoplastic resin substrate layer 1, the pattern layer 2, the transparent adhesive layer 3, and the transparent thermoplastic resin layer 4 are laminated in this order. Further, the overall thickness of the decorative sheet 10 is preferably in the range of 40 μm or more and less than 500 μm, and more preferably in the range of 60 μm or more and 425 μm or less.

Hereinafter, each configuration of the decorative sheet 10 will be more specifically described.

(1) Thermoplastic Resin Substrate Layer

The thermoplastic resin substrate layer 1 is made of, for example, a colored thermoplastic resin. The thermoplastic resin may be, for example, vinyl chloride resin, acrylic resin, or polyolefin-based polypropylene resin or polyethylene resin. Among others, polyolefin-based resins may be preferably used in view of environmental compatibility, processability, and price. Grades and compositions of the resin can also be selected taking into consideration ease of sheeting, printability, suitability for bending process.

The thermoplastic resin substrate layer 1 is preferably a polyolefin-based resin, polyester-based resin, or acrylic resin with a thickness in the range of 10 μm or more and 200 μm or less. When the thickness of the thermoplastic resin substrate layer 1 is smaller than 10 μm, concealability and processability may be reduced. Further, when the thickness of the thermoplastic resin substrate layer 1 is larger than 200 μm, performance such as bending processability may be reduced.

In coloring of the thermoplastic resin substrate layer 1, hue can be appropriately selected to conceal the substrate to which the decorative sheet is bonded, or as a base color of the pattern layer 2. For example, in sheeting of the thermoplastic resin, colorant such as a pigment may be mixed or kneaded therein for coloring. Alternatively, prior to providing the pattern layer 2, a coloring layer may be provided as a solid ink layer under the pattern layer 2 by using a coating or printing technique.

(2) Pattern Layer

The pattern layer 2 may be provided using a known printing technique. When the thermoplastic resin substrate layer 1 is prepared in the form of a roll, printing for forming the pattern layer 2 can be performed in a roll-to-roll printing apparatus. The printing technique is not particularly limited, and for example, gravure printing may be used considering productivity and quality of the design.

Any pattern may be used for the pattern layer considering designability as the decorative material. For wooden patterns, various types of grain patterns are often preferably used. Besides the grain patterns, cork patterns may also be used. For example, in the case where a pattern represents a floor of stone such as marble, a pattern of marble stone grain or the like may be used. In addition to the patterns of such natural materials, artificial patterns such as those in a motif of the natural materials or geometric patterns may be used as well.

The printing ink for forming the pattern layer 2 is not particularly limited, and is suitably selected and used depending on the printing method. Specifically, the ink is preferably selected considering adhesion and printability to the thermoplastic resin substrate layer 1, weather resistance as a decorative material, and the like.

If necessary, an adhesive layer (not shown) may be provided on the pattern layer 2 for the purpose of improving adhesion between the pattern layer 2 and the transparent adhesive layer 3. The resin used for the adhesive layer (not shown) is not particularly limited, and may be a two-part curable urethane resin, which is applied by using a coating machine, gravure printing machines, or the like.

(3) Transparent Adhesive Layer

The transparent adhesive layer 3 is provided for the purpose of enhancing adhesion of the thermoplastic resin substrate layer 1 and the pattern layer 2 to the transparent thermoplastic resin layer 4. When these layers are firmly bonded to each other, the decorative sheet 10 can obtain bending processability for following curved surfaces and right-angle surfaces. The transparent adhesive layer 3 is colorless and transparent, or colored and transparent, or may be colored to a degree that allows visible light to pass through.

The transparent adhesive layer 3 is preferably a polyethylene-based resin or a polypropylene-based resin with a thickness in the range of 5 μm or more and 30 μm or less. When the thickness of the transparent adhesive layer 3 is smaller than 5 μm, peeling strength may be reduced due to insufficient adhesion. Further, when the thickness of the transparent adhesive layer 3 is larger than 30 μm, performance such as scratch resistance or load resistance may be reduced. The transparent adhesive layer 3 is more preferably a polyethylene-based resin or a polypropylene-based resin with a thickness in the range of 10 μm or more and 30 μm or less.

(4) Transparent Thermoplastic Resin Layer

The transparent thermoplastic resin layer 4 may be, for example, vinyl chloride resin, acrylic resin, or polyolefin-based polypropylene resin or polyethylene resin. Among others, polyolefin-based resins may be preferably used in view of environmental compatibility, processability, and price.

Grades and compositions of the resin can also be selected taking into consideration ease of sheeting, printability, suitability for bending process. In particular, for bending processability, prevention of occurrence of whitening or cracking in a bent portion is of importance.

The transparent adhesive layer 3 and the transparent thermoplastic resin layer 4 may be formed, for example, by co-extrusion by which they are simultaneously extruded. The transparent thermoplastic resin layer 4 imparts a thickness or depth effect to the decorative sheet in terms of design, and also improves a weather resistance and abrasion resistance of the decorative sheet. The transparent thermoplastic resin layer 4 is colorless and transparent, or colored and transparent, or may be colored to a degree that allows some visible light to pass through.

The transparent thermoplastic resin layer 4 is preferably a polyethylene-based resin or polypropylene-based resin with a thickness of 30 μm or more and 200 μm or less. When the thickness of the transparent thermoplastic resin layer 4 is smaller than 30 μm, performance such as scratch resistance and abrasion resistance may be reduced. Further, when the thickness of the transparent thermoplastic resin layer 4 is larger than 200 μm, performance such as bending processability may be reduced. The transparent thermoplastic resin layer 4 is more preferably a polyethylene-based resin or polypropylene-based resin with a thickness of 50 μm or more and 150 μm or less.

(5) Surface Protective Layer

The surface protective layer 7 is formed on the transparent thermoplastic resin layer 4. As described above, the outermost layer, which is located at least on the outermost position of the surface protective layer 7 contains at least one of ionizing radiation-curable resin and thermosetting resin as a main component. Further, the thickness of the surface protective layer 7 is, for example, in the range of 3 μm or more and 50 μm or less. In the present embodiment, two layers of the first surface protective layer 5 and the second surface protective layer 6 are provided as an example of the surface protective layer 7.

The surface protective layer 7 may be a single-layer film or a laminate film composed of a plurality of layers. FIG. 1 illustrates the surface protective layer 7, which is a two-layered laminate film, and particularly, a layer located on the outermost position is the second surface protective layer 6 (outermost layer). As described above, the second surface protective layer 6, which is located at least on the outermost position of the surface protective layer 7, includes UV-curable resin, and is formed when irradiated with 365 nm wavelength UV light with an integrated light quantity in the range of 100 mJ/cm$^2$ or more and less than 400 mJ/cm$^2$.

Here, the UV-curable resin refers to a synthetic resin which chemically changes from liquid to solid in response to application of the energy of UV light. When a small amount of UV light energy is applied, resin hardening is insufficient, leading to a semisolid state. On the other hand, when a large amount of UV light energy is applied, heat is generated, which causes sheet defects such as flare and wrinkle.

Here, examples of the above UV-curable resin include polyfunctional HDI isocyanurate oligomer. Further, examples of a photoinitiator used as a sub-component of the UV-curable resin includes alkyl phenone-based photopolymerization initiator. Further, examples of the above thermosetting resin include a combination of polyfunctional acrylic polyol (base resin) and HDI-based isocyanate compound (hardener). Furthermore, layers including the surface protective layer 7 may also include a matting material such as a silica filler.

The UV-curable resin is not particularly limited, and may be transparent resins which contain a prepolymer (including oligomer) and/or monomer containing radical polymerizable double bond, which is polymerizable and crosslinkable by irradiation with UV light, in a molecule as a main component. The above prepolymer or monomer may be used singly or as a mixture thereof. The curing reaction is typically a crosslinking curing reaction.

Specifically, examples of the above prepolymer or monomer include compounds containing a radical polymerizable unsaturated group such as (meth)acryloyl group and (meth)acryloyloxy group, a cationic polymerizable functional group such as epoxy group, or the like in a molecule. Further, polyene/thiol-based prepolymer made of a combination of polyene and polythiol is also preferred. The (meth)acryloyl group described herein refers to acryloyl group or methacryloyl group.

Examples of the prepolymer containing a radical polymerizable unsaturated group include polyester (meth)acrylate, urethane (meth)acrylate, epoxy (meth)acrylate, melamine (meth)acrylate, triazine (meth)acrylate, and silicone (meth)acrylate. The molecular weight is preferably in the order of 250 to 100,000.

Examples of the monomer containing a radical polymerizable unsaturated group include monofunctional monomers such as methyl (meth)acrylate, 2-ethylhexyl (meth)acrylate, and phenoxyethyl (meth)acrylate. Further, examples of the polyfunctional monomer include diethylene glycol di(meth)

acrylate, propylene glycol di(meth)acrylate, trimethylolpropane tri(meth)acrylate, trimethylolpropane ethylene oxide tri(meth)acrylate, dipentaerythritol tetra(meth)acrylate, dipentaerythritol penta(meth)acrylate, and dipentaerythritol hexa(meth)acrylate.

Examples of the prepolymer containing a cationic polymerizable functional group include prepolymers of epoxy-based resins such as bisphenol type epoxy resin and novolak type epoxy compound, and vinyl ether-based resins such as fatty acid vinyl ether and aromatic vinyl ether. Further, examples of the thiol include polythiol such as trimethylolpropane trithioglycolate and pentaerythritol tetrathioglycolate. Examples of the polyene include those having allyl alcohol added on both ends of polyurethane containing diol and diisocyanate.

The UV light source may be a light source such as a super high-pressure mercury lamp, high pressure mercury lamp, low pressure mercury lamp, carbon arc lamp, black light, or metal halide lamp. Preferably, the wavelength of the UV light is typically in the range of 190 to 380 nm.

The surface protective layer 7 has an important role in determining the quality of bending processability, scratch resistance, and cleanability. Specifically, the role of the outermost layer is of importance with regard to scratch resistance, and physical properties of the outermost layer directly affect the scratch resistance of the sheet. In this regard, the present inventors have intensively studied and found the following findings. That is, the present inventors have found that the second surface protective layer 6 (outermost layer), which is located at least on the outermost surface of the surface protective layer 7, includes UV-curable resin, and satisfies the scratch resistance of the surface of the decorative sheet 10 when irradiated with 365 nm wavelength UV light with an integrated light quantity in the range of 100 mJ/cm$^2$ or more and less than 400 mJ/cm$^2$. As a result, the test result according to European standard EN16094 for the outermost surface of the surface protective layer 7 is 3 or more. The term "outermost surface" as described herein refers to the outermost surface of the first surface protective layer 5 when the surface protective layer 7 is a single layer, and refers to the outermost surface of the layer located on the outermost position (for example, the second surface protective layer 6) when the surface protective layer 7 is composed of a plurality of layers.

However, when the amount of energy applied to the UV-curable resin is too high, the decorative sheet 10 undergoes softening or shrinkage due to heat rays from the light source, heat generated during hardening of the surface protective layer 7, or heat due to heat absorption of the decorative sheet 10 itself. As a consequence, defects such as flare and wrinkle of the decorative sheet may occur.

In this regard, the present inventors have intensively studied and found that the defects of the decorative sheet 10 caused by the UV light energy of 100 mJ/cm$^2$ or more can be reduced when the outermost surface of the surface protective layer 7 satisfies the conditions of the test result according to the above standard, and the overall thickness of the decorative sheet 10 is in the range of 40 μm or more and less than 500 μm.

Accordingly, when the test result according to European standard EN16094 for the outermost surface of the surface protective layer 7 is 3 or more, and the overall thickness of the decorative sheet 10 is in the range of 40 μm or more and less than 500 μm, the decorative sheet exhibiting good scratch resistance while ensuring qualities such as appearance, as well as good bendability can be provided.

<Production Method of Decorative Sheet>

A method for producing the decorative sheet 10 according to the present embodiment includes the following steps (1) to (3).

(1) A step of forming a pattern layer on one surface of the thermoplastic resin substrate layer (2) A step of forming a transparent thermoplastic resin layer on the pattern layer (3) A step of forming one or more surface protective layers on the transparent thermoplastic resin layer Here, the above step (3) is a step of forming the surface protective layer by application of a coating liquid containing UV-curable resin and subsequent irradiation with 365 nm wavelength UV light with an integrated light quantity in the range of 100 mJ/cm$^2$ or more and less than 400 mJ/cm$^2$.

In addition, the decorative sheet 10 is formed to have the overall thickness in the range of 40 μm or more and less than 500 μm. This thickness is preferably in the range of 60 μm or more and 425 μm or less.

Further, the thermoplastic resin substrate layer is preferably a polyolefin-based resin or polyester-based resin with a thickness in the range of 10 μm or more and 200 μm or less.

Further, the transparent thermoplastic resin layer is preferably a polyolefin-based resin or polyester-based resin with a thickness in the range of 30 μm or more and 200 μm or less.

According to a modified example of the method for producing the decorative sheet 10 of the present embodiment, the aforementioned step of forming a surface protective layer may include a step of forming one or more first surface protective layers on the transparent thermoplastic resin layer and a step of forming a second surface protective layer as an outermost layer on the first surface protective layer.

In this case, the step of forming a second surface protective layer is a step of forming the second surface protective layer by application of a coating liquid containing UV-curable resin to the transparent thermoplastic resin layer and subsequent irradiation with 365 nm wavelength UV light with an integrated light quantity in the range of 100 mJ/cm$^2$ or more and less than 400 mJ/cm$^2$. In this configuration, a film thickness of the first surface protective layer is preferably in the range of 1 μm or more and less than 30 μm.

Thus, when the step of forming a surface protective layer is a step of forming the surface protective layer by application of a coating liquid containing UV-curable resin and subsequent irradiation with 365 nm wavelength UV light with an integrated light quantity in the range of 100 mJ/cm$^2$ or more and less than 400 mJ/cm$^2$, and the overall thickness is in the range of 40 μm or more and less than 500 the decorative sheet exhibiting good scratch resistance while ensuring qualities such as appearance, as well as good bendability, can be provided.

(Decorative Material)

Next, a decorative material according to an embodiment of the present invention will be described.

Figure 2:
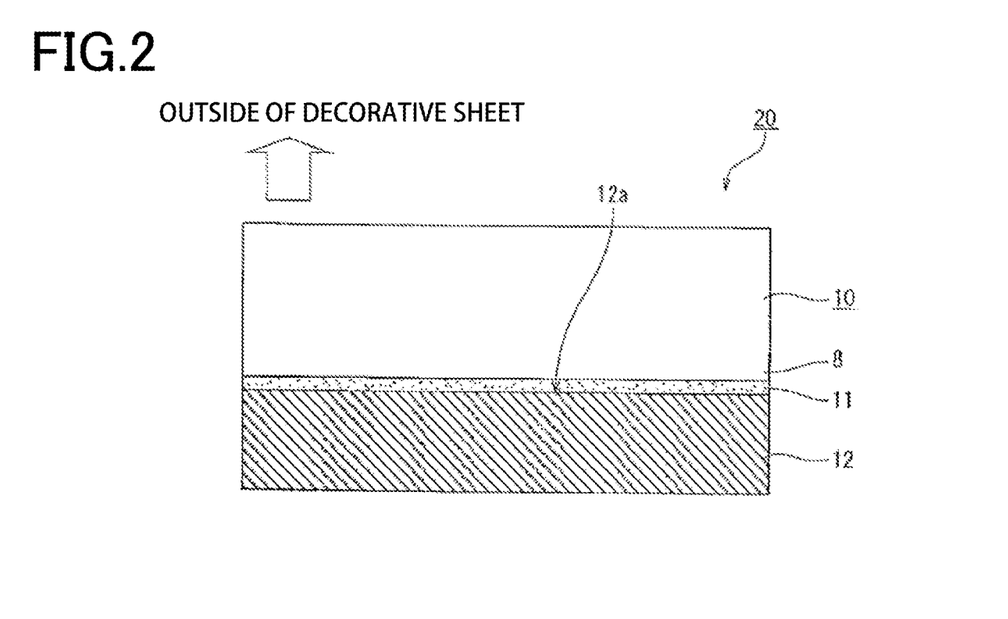
FIG. 2 is a cross-sectional view illustrating a configuration of a decorative material according to an embodiment of the present invention.

As shown in FIG. 2, a decorative material 20 of the present embodiment includes the aforementioned decorative sheet 10 and a wooden substrate 12. For example, the decorative sheet 10 is provided on one surface 12a of the wooden substrate 12 to form a decorative material 20.

An adhesive layer 11 is provided between the wooden substrate 12 and the decorative sheet 10 such that the wooden substrate 12 and the decorative sheet 10 are adhered via the adhesive layer 11.

Next, the adhesive layer 11 and the wooden substrate 12 are more specifically described.

(1) Wooden Substrate

The wooden substrate 12 is, for example, a plywood, particle board, medium density fiberboard (MDF), or hardboard. The wooden substrate 12 has a thickness in the range of 1 mm or more and 50 mm or less, for example.

(2) Adhesive Layer

The adhesive layer 11 is, for example, thermoplastic resin-based, thermosetting resin-based, or rubber (elastomer)-based adhesive. These additives can be suitably selected from known additives or commercially available additives.

Advantageous Effect of Embodiment

According to an embodiment of the present invention, the step of forming a surface protective layer is performed by application of a coating liquid containing UV-curable resin and subsequent irradiation with 365 nm wavelength UV light with an integrated light quantity in the range of 100 mJ/cm$^2$ or more and less than 400 mJ/cm$^2$, and the overall thickness is in the range of 40 µm or more and less than 500 µm. Accordingly, the method for producing a decorative sheet exhibiting good scratch resistance while ensuring qualities such as appearance, as well as good bendability, can be provided.

Further, according to an embodiment of the present invention, the test result according to European standard EN16094 for the outermost surface of the surface protective layer is 3 or more, and the overall thickness of the decorative sheet is in the range of 40 µm or more and less than 500 µm. Accordingly, the decorative sheet and the decorative material exhibiting good scratch resistance while ensuring qualities such as appearance, as well as good bendability, can be provided.

OTHER CONFIGURATION EXAMPLES

The above embodiment has been described for the case where the decorative material 20 is formed from the decorative sheet 10 shown in FIG. 1. However, in the present embodiment, a decorative material provided with a moisture-proof sheet may be provided on a surface of the decorative sheet 10 on a side opposite to that facing the wooden substrate 12 with an adhesive layer or the like interposed therebetween. With this configuration as well, the effects of the above embodiment can be obtained.

EXAMPLES

The present invention will be further described in detail by the following examples. However, the present invention is not limited to these examples.

Example 1

A decorative sheet similar to the one shown in FIG. 1 was produced by the following materials and procedures.

(1) A 25 µm-thick polypropylene film was prepared as a thermoplastic resin substrate layer. A pattern layer was provided on one surface of the polypropylene film by printing a wood grain pattern using gravure ink ("Lamistar" manufactured by Toyo Ink Manufacturing Co., Ltd.) by a gravure printing machine.

(2) Then, a two-part urethane-based primer resin containing silica particles was applied by gravure coating to a surface of the thermoplastic resin substrate layer on a side opposite to that facing the pattern layer at a dry thickness of 1 µm.

(3) Then, a two-part urethane resin-based adhesive containing polyester polyol as a base resin and isophorone diisocyanate as a hardener was applied on the pattern layer at a dry thickness of 1 g/m$^2$.

(4) Then, 4 µm of a transparent adhesive layer (maleic acid-modified polypropylene resin) and 20 µm of a transparent thermoplastic resin layer containing homopolypropylene (manufactured by Prime Polymer Co., Ltd.) as a main component were co-extruded such that the transparent adhesive layer faced the pattern layer.

(5) Then, a thermosetting acrylic urethane resin (manufactured by DIC Graphics Corporation) was applied as a first surface protective layer on a surface of the transparent thermoplastic resin layer at a dry thickness of 3 µm.

(6) Then, as an outermost layer, a UV-curable urethane acrylate resin (manufactured by DIC Graphics Corporation) and a thermosetting acrylic urethane resin (manufactured by DIC Graphics Corporation) were mixed at a mixture ratio of 6:4 based on mass ratio. Then, the mixed resin was applied at a dry thickness of 6 µm. Subsequently, the applied resin was hardened by UV light radiation (high pressure mercury lamp, 300 mJ/cm$^2$) to thereby form a decorative sheet.

Example 2

A decorative sheet of Example 2 was produced by the same procedure as that of Example 1 except that the overall thickness of the decorative sheet was 160 µm, the thickness of the thermoplastic resin substrate layer was 60 µm, the thickness of the transparent thermoplastic resin layer was 85 µm, and the integrated light quantity of UV light radiation was 200 mJ/cm$^2$.

Example 3

A decorative sheet of Example 3 was produced by the same procedure as that of Example 1 except that the overall thickness of the decorative sheet was 215 µm, the thickness of the thermoplastic resin substrate layer was 60 µm, the thickness of the transparent thermoplastic resin layer was 140 µm, and the integrated light quantity of UV light radiation was 200 mJ/cm$^2$.

Example 4

A decorative sheet of Example 4 was produced by the same procedure as that of Example 1 except that the overall thickness of the decorative sheet was 425 µm, the thickness of the thermoplastic resin substrate layer was 60 µm, the thickness of the transparent thermoplastic resin layer was 350 µm, and the integrated light quantity of UV light radiation was 100 mJ/cm$^2$.

Example 5

A decorative sheet of Example 5 was produced by the same procedure as that of Example 1 except that the overall thickness of the decorative sheet was 40 µm, the thickness of the thermoplastic resin substrate layer was 10 µm, and the thickness of the transparent thermoplastic resin layer was 15 µm.

Example 6

A decorative sheet of Example 6 was produced by the same procedure as that of Example 1 except that the overall thickness of the decorative sheet was 495 μm, the thickness of the thermoplastic resin substrate layer was 60 μm, and the thickness of the transparent thermoplastic resin layer was 420 μm.

Example 7

A decorative sheet of Example 7 was produced by the same procedure as that of Example 1 except that the overall thickness of the decorative sheet was 160 μm, the thickness of the thermoplastic resin substrate layer was 60 μm, the thickness of the transparent thermoplastic resin layer was 85 μm, and the integrated light quantity of UV light radiation was 380 mJ/cm$^2$.

Comparative Example 1

A decorative sheet of Comparative Example 1 was produced by the same procedure as that of Example 1 except that the overall thickness of the decorative sheet was 35 μm, the thickness of the thermoplastic resin substrate layer was 10 μm, and the thickness of the transparent thermoplastic resin layer was 10 μm.

Comparative Example 2

A decorative sheet of Comparative Example 2 was produced by the same procedure as that of Example 1 except that the overall thickness of the decorative sheet was 575 μm, the thickness of the thermoplastic resin substrate layer was 60 μm, the thickness of the transparent thermoplastic resin layer was 500 μm, and the integrated light quantity of UV light radiation was 100 mJ/cm$^2$.

Comparative Example 3

A decorative sheet of Comparative Example 3 was produced by the same procedure as that of Example 1 except that the overall thickness of the decorative sheet was 215 μm, the thickness of the thermoplastic resin substrate layer was 60 μm, the thickness of the transparent thermoplastic resin layer was 140 μm, and the integrated light quantity of UV light radiation was 80 mJ/cm$^2$.

Comparative Example 4

A decorative sheet of Comparative Example 4 was produced by the same procedure as that of Example 1 except that the overall thickness of the decorative sheet was 425 μm, the thickness of the thermoplastic resin substrate layer was 60 μm, the thickness of the transparent thermoplastic resin layer was 350 μm, and the integrated light quantity of UV light radiation was 400 mJ/cm$^2$.

(Performance Evaluation)

The decorative sheets of Examples 1 to 7 and Comparative Examples 1 to 4 were bonded to a surface of a 3 mm-thick MDF (hardwood). In bonding the decorative sheet to the MDF, a two-part aqueous emulsion adhesive ("Rikabond" manufactured by Chirika Co., Ltd. (mass ratio BA-10L/BA-11B=100:2.5)) was applied as an adhesive at a grammage of 100 g/m$^2$ in a wet state. After the bonding using the above adhesive, aging was performed for 24 hours to thereby provide a decorative material.

The decorative material thus obtained was evaluated by the following process. Table 1 shows the evaluation results.

<Micro-Scratch Test>

The test procedure complies with European standard "EN 16094." In two test procedures, i.e., MSR-A and MSR-B, which are evaluated on a 1 to 5 scale, 2 or lower was rated as poor, 3 was rated as good, and 4 or higher was rated as excellent. Table 1 shows the evaluation results.

<Sheet Appearance>

The degree of flare and wrinkle were evaluated. Table 1 shows the evaluation results. The evaluation criteria were as follows.

Excellent: No flare or wrinkle was observed on the sheet.
Good: Almost no flare or wrinkle was observed on the sheet.
Poor: Flare or wrinkle was observed on the sheet.

<Bendability>

The decorative sheet, which was bent at 90 degrees, was evaluated as poor when large cracks occurred, good when cracks occurred to a small extent, and excellent when no cracks occurred. Table 1 shows the evaluation results.

TABLE 1

| | Thickness of layers [μm] | | | First surface protective layer | Integrated light quantity (mJ/cm$^2$) | Evaluation | | | |
|---|---|---|---|---|---|---|---|---|---|
| | Overall sheet | Substrate | Thermoplastic resin layer | | | Micro-scratch test | | Sheet appearance | Bendability |
| | | | | | | MSR-A | MSR-B | | |
| Example 1 | 60 | 25 | 20 | 3 | 300 | Excellent | Excellent | Good | Excellent |
| Example 2 | 160 | 60 | 85 | 3 | 200 | Excellent | Excellent | Excellent | Excellent |
| Example 3 | 215 | 60 | 140 | 3 | 200 | Excellent | Excellent | Excellent | Good |
| Example 4 | 425 | 60 | 350 | 3 | 100 | Good | Good | Excellent | Good |
| Example 5 | 40 | 10 | 15 | 3 | 300 | Excellent | Excellent | Good | Excellent |
| Example 6 | 495 | 60 | 420 | 3 | 300 | Excellent | Excellent | Good | Good |
| Example 7 | 160 | 60 | 85 | 3 | 380 | Excellent | Excellent | Good | Excellent |
| Comparative Example 1 | 35 | 10 | 10 | 3 | 300 | Excellent | Excellent | Poor | Excellent |
| Comparative Example 2 | 575 | 60 | 500 | 3 | 100 | Good | Good | Excellent | Poor |
| Comparative Example 3 | 215 | 60 | 140 | 3 | 80 | Poor | Poor | Excellent | Good |
| Comparative Example 4 | 425 | 60 | 350 | 3 | 400 | Excellent | Excellent | Poor | Good | resin layer was 140 μm, and the integrated light quantity of UV light radiation was 80 mJ/cm$^2$.

As shown in Table 1, it was found that the decorative sheets of Examples 1 to 7, which were formed by irradiation with 365 nm wavelength UV light with an integrated light quantity in the range of 100 mJ/cm$^2$ or more and less than 400 mJ/cm$^2$ in the step of forming a surface protective layer that constitutes the decorative sheet and formed to have the overall thickness in the range of 40 μm or more and less than 500 μm had good scratch resistance (micro-scratch test), sheet appearance, and bendability. In particular, it was found that the decorative materials of Examples 1 to 3 and 5 to 7 had particularly good scratch resistance (micro-scratch test). Further, it was found that the decorative materials of Examples 2 to 4 had particularly good sheet appearance, and the decorative materials of Examples 1, 2, 5, and 7 had particularly good bendability.

Therefore, according to the present invention, it is possible to provide a decorative sheet exhibiting good scratch resistance while ensuring qualities such as appearance, as well as good bendability, and a method for producing the same, and a decorative material.

INDUSTRIAL APPLICABILITY

A decorative sheet and a method for producing the same, and a decorative material according to the present invention can be suitably applied to floor materials for houses, shops, offices, gymnasiums, and the like, and other applications.

REFERENCE SIGNS LIST

1: Thermoplastic resin substrate layer; 2: Pattern layer; 3: Transparent adhesive layer; 4: Transparent thermoplastic resin layer; 5: First surface protective layer; 6: Second surface protective layer (outermost layer); 7: Surface protective layer; 10: Decorative sheet; 11: Adhesive layer; 12: Wooden substrate; 20: Decorative material.

What is claimed is:

1. A decorative sheet comprising:
a thermoplastic resin substrate layer;
a pattern layer;
a transparent thermoplastic resin layer; and
a surface protective layer, wherein the surface protective layer comprises an UV-curable resin, wherein a test result of a scratch resistance test according to European standard EN16094 for an outermost surface of the surface protective layer is 3 or more;
which are disposed at least in this order, and
an overall thickness is in a range of 40 μm or more and less than 500 μm.

2. The decorative sheet of claim 1, wherein the thermoplastic resin substrate layer is a polyolefin-based resin or a polyester-based resin with a thickness in a range of 10 μm or more and 200 μm or less.

3. The decorative sheet of claim 1, wherein the transparent thermoplastic resin layer is a polyolefin-based resin or a polyester-based resin with a thickness in a range of 30 μm or more and 200 μm or less.

4. The decorative sheet of claim 1, wherein
the surface protective layer is composed of one or more first surface protective layers provided on the transparent thermoplastic resin layer, and a second surface protective layer provided as an outermost layer, and
the first surface protective layer is formed with a film thickness of 1 μm or more and 30 μm or less.

5. A decorative material comprising:
the decorative sheet according to claim 4;
an adhesive layer provided on a surface of the thermoplastic resin substrate layer of the decorative sheet on a side opposite to that facing the pattern layer; and
a substrate which is adhered to the thermoplastic resin substrate layer via the adhesive layer.

6. A method for producing a decorative sheet, comprising the steps of:
forming a pattern layer on one surface of a thermoplastic resin substrate layer;
forming a transparent thermoplastic resin layer on the pattern layer; and
forming one or more surface protective layers on the transparent thermoplastic resin layer, wherein
the step of forming the surface protective layer is a step of forming the surface protective layer by application of a coating liquid containing UV-curable resin and subsequent irradiation with 365 nm wavelength UV light with an integrated light quantity in a range of 100 mJ/cm$^2$ or more and less than 400 mJ/cm$^2$, and
an overall thickness is in a range of 40 μm or more and less than 500 μm.

7. The method for producing a decorative sheet of claim 6, wherein
the step of forming the surface protective layer is composed of a step of forming one or more first surface protective layers on the transparent thermoplastic resin layer, and a step of forming a second surface protective layer as an outermost layer on the first surface protective layer, and
the step of forming the second surface protective layer is a step of forming the second surface protective layer by application of a coating liquid containing UV-curable resin onto the transparent thermoplastic resin layer and subsequent irradiation with 365 nm wavelength UV light with an integrated light quantity in a range of 100 mJ/cm$^2$ or more and less than 400 mJ/cm$^2$.

8. The decorative sheet of claim 1, wherein the UV-curable resin comprises a polyfunctional hexamethylene diisocyanate isocyanurate oligomer.

9. The decorative sheet of claim 1, wherein the UV-curable resin comprises a sub-component, and wherein the sub-component comprises an alkyl phenone-based photopolymerization initiator.

10. The decorative sheet of claim 1, wherein the UV-curable resin comprises a transparent UV-curable resin, and wherein the transparent UV-curable resin comprises a prepolymer, a monomer containing radical polymerizable double bond, and/or a combination thereof.

11. The decorative sheet of claim 1, wherein the prepolymer or the monomer comprises compounds containing a radical polymerizable unsaturated group or a cationic polymerizable functional group.

12. The decorative sheet of claim 11, wherein the prepolymer comprising the radical polymerizable unsaturated group comprises polyester (meth)acrylate, urethane (meth)acrylate, epoxy (meth)acrylate, melamine (meth)acrylate, triazine (meth)acrylate, or silicone (meth)acrylate.

13. The decorative sheet of claim 10, wherein the prepolymer exhibits a molecular weight from about 250 to 100,000.

14. The decorative sheet of claim 10, wherein the monomer containing a radical polymerizable unsaturated group comprises a monofunctional compound or a polyfunctional compound.

15. The decorative sheet of claim 14, wherein the monofunctional compound comprises methyl (meth)acrylate, or 2-ethylhexyl (meth)acrylate.

16. The decorative sheet of claim 14, wherein the polyfunctional compound comprises diethylene glycol di(meth)acrylate, propylene glycol di(meth)acrylate, trimethylolpropane tri(meth)acrylate, trimethylolpropane ethylene oxide tri(meth)acrylate, dipentaerythritol tetra(meth)acrylate, dipentaerythritol penta(meth)acrylate, or dipentaerythritol hexa(meth)acrylate.

17. The decorative sheet of claim 1, wherein the test result of the scratch resistance test according to European standard EN16094 for the outermost surface of the surface protective layer is 4 or more.

18. The decorative sheet of claim 1, wherein the pattern layer in direct physical contact with the thermoplastic resin substrate layer.

19. The decorative sheet of claim 1, further comprising a transparent adhesive layer and wherein the pattern layer is in direct physical contact with the thermoplastic resin substrate layer, the transparent adhesive layer is in direct physical contact with the thermoplastic resin substrate layer, the pattern layer and the transparent thermoplastic resin layer, thereby bonding the thermoplastic resin substrate layer and the pattern layer to the transparent thermoplastic resin layer; the surface protective layer is in direct physical contact with the transparent thermoplastic resin layer.

20. The decorative sheet of claim 19, wherein the surface protective layer in a single-layer film.

* * * * *